United States Patent Office 3,563,894
Patented Feb. 16, 1971

3,563,894
GREASE COMPOSITION
John B. Christian, Yellow Springs, Ohio, assignor to the United States of America as represented by the Secretary of the Air Force
No Drawing. Continuation-in-part of application Ser. No. 420,842, Dec. 23, 1964. This application Feb. 16, 1968, Ser. No. 705,944
Int. Cl. C10m 7/50
U.S. Cl. 252—25                          2 Claims

ABSTRACT OF THE DISCLOSURE

A grease formulation capable of maintaining its dimensional stability under heavy load and high temperature conditions consisting of (1) a major proportion of trifluoropropylmethylsiloxane having a viscosity of 300 centistokes and consisting essentially of $$CF_3CH_3CH_2Si(CH_3)O$$

units and endblocking units of the formula $(CH_3)2SiO_5$; (2) a minor proportion by weight of a composition consisting of (a) 50–55% by weight of bitolylene diisocyanate, (b) 20–30% by weight of p-chloraniline, and (c) 20–25% by weight of p-toluidine; and (3) 10% by weight of molybdenum disulfide.

---

The invention described herein may be manufactured and used by or for the United States Government for governmental purposes without the payment to me of any royalty thereon.

CROSS-REFERENCES TO RELATED APPLICATIONS

This application is a continuation-in-part of U.S. patent application Ser. No. 420,842 now abandoned, filed Dec. 23, 1964 by John B. Christian.

BACKGROUND OF THE INVENTION

In the art of lubricants generally and of greases in particular, it has been known that improved temperature characteristics may be achieved by the use of a variety of organosiloxane fluids having the general formula $R_nSiO_{4-n/2}$ where $n$ has an average value of from 1.9 to 3.0 and R is a monovalent hydrocarbon radical such as a methyl, monoacyclic aryl, halogenated aryl hydrocarbon or a mixture thereof. To formulate greases from such lubricating fluids, it has been the practice to add a wide variety of organic and inorganic materials as fillers or thickeners to impart a dimensional stability or grease-like consistency which is to be distinguished from and is more than a mere matter of degree of increasing viscosity. Such thickening agents have included graphite, clay, carbon black, silica gel, fumed silica, metallic salts of higher fatty acids such as lithium stearate, a variety of polymeric fluorocarbon compounds and the like.

While many permutations and combinations of these various lubricating fluids and grease-formulating additives have represented substantial improvements in the art of lubrication and have met many of the demands of high speed and high temperature operations of the type encountered in modern ultrasonic aircraft, aerospace vehicles and the like, the load carrying or supporting characteristics of the lubricant have continued to represent a deficiency or limiting factor of performance. Moreover, in those few instances wherein the load- carrying capability of the grease has been improved to the point at which it will withstand some short period of operation at high speeds or in extreme hyperthermal environments, the lubricity or anti-wear protection for which the lubricant was sought in the first instance has had to be compromised to the point at which the formulation in its total aspect has had to be discarded or its use substantially curtailed. Thus, while modern technology has provided lubricants which are suitable for many high speed and high temperature applications, the grease formulation of this invention provides the first such lubricant capable of providing excellent lubricating qualities and heavy load supporting capabilities under these same conditions.

Specifically, this invention relates to an improved grease formulation and particularly to one which, under extremes of temperature and pressure or load will maintain its dimensional stability and its lubricity.

It is accordingly an object of this invention to provide an improved grease formulation based upon an organosiloxane fluid.

Still another object of the present invention is to provide an improved grease formulation which will be capable of operation under conditions of heavy load in extreme thermal environments.

Still another object of the invention is to provide such grease formulation which under the extreme thermal and load conditions will maintain its lubricity.

Still another object of the present invention is to provide such a grease formulation which will maintain its dimensional stability and lubricity both at extreme and normal load and thermal conditions throughout prolonged exposure to either of said conditions or successive cyclings of such exposure.

Still another object of the invention is to provide a method for the manufacture of such a grease formulation.

DESCRIPTION OF THE PREFERRED EMBODIMENTS

To achieve these and other objects and advantages which will appear from a reading of the following disclosure, the present invention provides the admixture of a fluorine-containing organosiloxane, a minor proportion of an aryl-substituted urea based thickening compound and a minor proportion of molybdenum disulfide. In one specific embodiment of the invention, the fluorine-containing organopolysiloxane fluid is trifluoropropylmethylsiloxane having a viscosity of 300 centistokes which is manufactured and sold by the Dow Corning Company of Midland, Mich., under its trade designation "FS 1265 Fluorosilicone" and which is a linear siloxane copolymer fluid consisting essentially of $CF_3CH_3CH_2Si(CH_3)O$ units and endblocking units of the formula $(CH_3)_2SiO_{.5}$ as described in U.S. Patent No. 2,961,425 and is specifically claim 7 thereof. A preferred arylurea-based thickening composition may be in the form of an admixture of at least a major proportion by weight of a diisocyanate such as bitolylene diisocyanate and lesser or minor weight proportions of certain compatible aromatic amines such as p-chloroaniline and/or p-toluidine. Particularly satisfactory results have been obtained when the arylurea thickening component used in connection with the specific trifluoropropylmethylsiloxane fluid described above is made up of from fifty to fifty-five weight percent of the bitolylene diisocyanate, from twenty to thirty percent by weight of the p-chloroaniline and from twenty to twenty-five percent of the p-toluidine.

In one specific formulation embodying the above-enumerated preferred ingredients, the following recipe is followed:

| | Parts by weight |
|---|---|
| Dow Corning FS 1265 fluorosilicone (300 cs.) | 72 |
| Bitolylene diisocyanate | 9.54 |
| p-Chloroaniline | 4.68 |
| p-Toluidine | 3.78 |
| Molybdenum disulfide (technical grade) | 10 |

In the preparation of the above recipe, all of the bitolylene diisocyanate and two-thirds of the fluorosilicone or organopolysiloxane oil are placed in a mixer and heated to from 250° to 300° Fahrenheit while stirring. All of the p-chloroaniline and one-sixth of the fluorosilicone are placed in a second container and heated to from 250° to 300° Fahrenheit while stirring; and all of the p-toluidine and the remaining one-sixth of the oil are placed in a third mixer and heated to the same 250° to 300° Fahrenheit while stirring. After the solute contents of the three separate mixtures have been completely dissolved in the oil, the chloroaniline and toluidine mixtures are rapidly and simultaneously added to the bitolylene diisocyanate solution while it is being stirred. All of the molybdenum disulfide is then added to mixture and mixed with a spatula. After the mixture is cooled to about from 200° to 250° Fahrenheit, the grease is milled on a three-roll mill for from five to ten passes.

As a demonstration of the improvements in both load carrying characteristics and lubricity of the formulation according to the above recipe and processing procedure, the following test results are obtained:

The grease of Military Specification MIL-G-27549 consists of:

| | Percent |
|---|---|
| Dow Corning DC-4039 silicone fluid | 75.2 |
| Arylurea thickener | 18.8 |
| Pentachlorophenyl mercapto acetic acid | 6.0 |

While the within invention has been described in connection with certain preferred ingredients and one specific embodiment thereof, it is to be understood that the foregoing particularization has been for the purpose of illustration only and does not limit the scope of the invention as it is defined by the subjoined claims.

What I claim is:

1. A grease formulation consisting essentially of
   (1) 72% by weight of a polymeric lubricating oil thickened with
   (2) 18% by weight of an aryl-substituted urea thickening agent, and
   (3) 10% by weight $MoS_2$ wherein said lubricating oil is a linear siloxane copolymer fluid having a viscosity of 300 centistokes and which consists essentially of repeating units having the formula $CF_3CH_2CH_2Si(CH_3)O$ and end blocking units having the formula $(CH_3)_2SiO_{.5}$ and wherein said aryl-substituted urea thickening agent is prepared by mixing 50-55% by weight of bitolylene diisocyanate, 20-30% by weight of p-chloroaniline, and 20-25% by weight of p-toluidine and heating to temperatures from about 250° F. to about 300° F.

2. A grease formulation according to claim 1 where 72% by weight of the total formulation is said lubricat-

| Test | Method | Result |
|---|---|---|
| Unworked penetration | ASTM D217-60T | 330. |
| Worked penetration (60 strokes) | ASTM D217-60T | 350. |
| Dropping point | ASTM D566-42 | 460° F. |
| Oil separation at 450° F | Fed test method std. 791 Method 321 | 10.3%. |
| Evaporation, 22 hrs. at 450° F | ASTM D972-56 | 10.2%. |
| Copper strip corrosion, 72 hrs. 212° F | Fed test method Std. 791 Method 5309 | No staining. |
| Water resistance | ASTM D1264-53T | 7.58%. |
| Rust preventive properties | ASTM D1743-60T | No staining. |
| Mean hertz value | Fed test method Std. 791 Method 6503 | 58.9. |
| Oscillation bearing test, 425° F., 4,000 lbs | Military specification MIL-G-27549 | 170,886 cycles. |
| Low temperature torque, −60° F | ASTM D1478 (starting) | 8,000 g. cm. |
| | (running) | 2,000 g. cm. |
| Low temperature torque, −40° F | ASTM D1478 (starting) | 3,600 g. cm. |
| | (running) | 332 g. cm. |
| Shell 4-ball wear test, 2 hrs. 167° F., 1,200 r.p.m., 40 kg., 52-100 balls | Military specification MIL-G-25760 | 0.6 mm. scar. |
| Shell 4-ball wear test, 2 hrs., 400° F., 600 r.p.m., 40 kg., M-10 balls | do | 0.6 mm. scar. |
| Shell 4-ball wear test, 2 hrs., 400° F., 1,200 r.p.m., 40 kg., M-10 balls | do | 0.7 mm. scar. |
| Shell 4-ball wear test, 2 hrs., 400° F., 600 r.p.m., 50 kg., M-10 balls | do | 0.6 mm. scar. |
| Shell 4-ball wear test, 2 hrs., 400° F., 1,200 r.p.m., 50 kg., M-10 balls | do | 0.8 mm. scar. |
| Worked stability (100,000 strokes) | Fed Test Method Std. 791 Method 313.1 | 358. |

In addition, the excellent properties and performance of the grease composition (A) of the present invention compared to a well known grease formulation (B) which is MIL-G-27459, is evident from the following tabulation:

ing oil, wherein 18% by weight of the total formulation is said aryl-substituted urea thickening agent prepared by mixing 9.54% by weight of the total formulation of bitolylene diisocyanate, 4.68% by weight of the total formulation of p-chloroaniline, and 3.78% by weight of

| | | Results | |
|---|---|---|---|
| Test | Method | B | A |
| (1) Unworked penetration | ASTM-D 217 | 290 | 330. |
| (2) Worked penetration | ASTM-D 217 | 301 | 350. |
| (3) Dropping point | ASTM-D 566-42 | 473° F | 460° F. |
| (4) Mean hertz value | Fed. test method Std. 791, Method 6503 | 60 | 58.9. |
| (5) Oscillation bearing test, 425° F., 4,000 lbs | Military specification MIL-G-27549 | 68,952 cycles | 170,886 cycles. |
| (6) Shell 4-ball test, 2 hrs., 10 kg., 1,200 r.p.m., 167° F. (wear scar diameter). | Military specification | 1.24 mm | 0.40 mm. |
| (7) Shell 4-ball test, 2 hrs., 40 kg., 1,200 r.p.m., 400° F (wear scar diameter). | Military specification | 3.478 mm | 0.70 mm. | the total formulation of p-toluidine in said lubricating oil, and 10% by weight of the total formulation is molybdenum disulfide.

References Cited

UNITED STATES PATENTS

| | | | |
|---|---|---|---|
| 2,609,342 | 9/1952 | White et al. | 252—25 |
| 2,710,839 | 6/1955 | Swakon et al. | 252—51.5 |
| 2,710,840 | 6/1955 | Swakon et al. | 252—51.5 |
| 2,710,841 | 6/1955 | Swakon et al. | 252—51.5 |
| 2,961,425 | 11/1960 | Pierce et al. | 260—448.2 |
| 3,170,878 | 2/1965 | Armstrong | 252—25 |

DANIEL E. WYMAN, Primary Examiner

I. VAUGHN, Assistant Examiner

U.S. Cl. X.R.

252—49.6